United States Patent
Chan

(10) Patent No.: US 10,521,384 B2
(45) Date of Patent: Dec. 31, 2019

(54) MOBILE HARDWARE FOB WITH DEVICE ECOSYSTEM FOR MODULAR I/O EXTENSION DEVICES

(71) Applicant: Facebook, Inc., Menlo Park, CA (US)

(72) Inventor: Stephen Tsun-Wang Chan, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/884,207

(22) Filed: Jan. 30, 2018

(65) Prior Publication Data

US 2018/0157610 A1 Jun. 7, 2018

Related U.S. Application Data

(63) Continuation of application No. 15/062,038, filed on Mar. 4, 2016, now Pat. No. 9,892,076.

(51) Int. Cl.
  *G06F 13/38* (2006.01)
  *G06F 13/40* (2006.01)
  *G06F 13/42* (2006.01)

(52) U.S. Cl.
  CPC ........ *G06F 13/385* (2013.01); *G06F 13/4068* (2013.01)

(58) Field of Classification Search
  CPC ....... G06F 13/385; G06F 13/463; G06F 13/42
  USPC ......................................................... 710/63
  See application file for complete search history.

(56) References Cited

U.S. PATENT DOCUMENTS

| | | |
|---|---|---|
| 6,112,139 A | 8/2000 | Schubert et al. |
| 2005/0085248 A1 | 4/2005 | Ballay et al. |
| 2005/0086366 A1 | 4/2005 | Luebke et al. |
| 2009/0077675 A1 | 3/2009 | Cabouli |
| 2012/0071140 A1 | 3/2012 | Oesterling et al. |
| 2014/0064488 A1 | 3/2014 | Ho |
| 2014/0173439 A1 | 6/2014 | Gutierrez et al. |
| 2014/0282967 A1* | 9/2014 | Maguire ................. H04W 4/80 726/7 |
| 2014/0324961 A1* | 10/2014 | Hollstrom ......... G06F 17/30058 709/203 |
| 2015/0100795 A1 | 4/2015 | Fogelson et al. |
| 2015/0235487 A1* | 8/2015 | Proefke .............. G07C 9/00007 340/5.61 |
| 2015/0363988 A1* | 12/2015 | Van Wiemeersch ..... H04M 1/11 455/557 |
| 2016/0062572 A1* | 3/2016 | Yang ..................... G06F 3/0482 715/835 |

(Continued)

*Primary Examiner* — Christopher B Shin
(74) *Attorney, Agent, or Firm* — Fenwick & West LLP

(57) ABSTRACT

A fob device includes a portable housing below a size needed to accommodate an input/output component for providing access to a functionality of the fob device that would not otherwise be accessible. The fob device also includes a mobile processor, a wireless interface, a volatile memory, a rechargeable battery, a charging interface, and storage medium having instructions that when executed causes the fob to receive a pairing request from a modular extension device that can provide access to the full functionality of the fob device that would not otherwise be accessible, pair with the modular extension device, and provide interfaces to the modular extension device that are customized based on a form factor of the modular extension device.

21 Claims, 3 Drawing Sheets

(56) References Cited

U.S. PATENT DOCUMENTS

| | | | |
|---|---|---|---|
| 2016/0253651 A1* | 9/2016 | Park | G06F 3/0482 705/39 |
| 2016/0321915 A1* | 11/2016 | Kahl | H04Q 9/00 |
| 2017/0203720 A1* | 7/2017 | Peeters | H04L 63/061 |
| 2017/0206720 A1 | 7/2017 | Ellis | |

* cited by examiner

MOBILE HARDWARE FOB WITH DEVICE ECOSYSTEM FOR MODULAR I/O EXTENSION DEVICES

CROSS REFERENCE TO RELATED APPLICATIONS

This application is a continuation of U.S. application Ser. No. 15/062,038, filed Mar. 4, 2016, which is incorporated by reference in its entirety.

BACKGROUND

This disclosure relates generally to mobile devices, and more specifically to a mobile hardware fob with a device ecosystem for modular I/O extension devices.

Current mobile devices, such as mobile phones, tablets, wearables, and other mobile devices are packaged in a form factor that includes all the input/output (I/O), power, and other hardware components needed for the mobile device to function as a self-contained entity. The mobile device may also include within its form factor additional feature components such as a camera, biometric reader, and so on. As device manufacturers continue to reduce the form factor size of mobile devices and in some cases to ensure a steady cycle of newly released product versions, they have continued to integrate these components into their mobile devices such that they are no longer removable. For example, most mobile phones no longer have a removable battery.

However, this creates an undesirable situation for a user. A user with a mobile device may become unsatisfied with a particular component of the mobile device. However, in order to change or upgrade that component, the user must replace the mobile device with a completely new mobile device that includes the changed component. Furthermore, as manufacturers design mobile devices to be more portable and lightweight, some components must be made smaller or made more limited in functionality to accommodate the newer form factor, resulting in an underperforming mobile device. As the mobile device market evolves, manufacturers also create mobile devices with more specific features that may be unavailable with other mobile devices or may differ significantly in specifications. This creates a fragmented market where mobile devices have vastly different capabilities, which makes developing applications and other tools for these devices more difficult.

SUMMARY

According to some embodiments, a hardware fob ecosystem interfaces with one or more modular extension devices. The hardware fob is a mobile computing device with components including a battery, wireless interface, mobile process, storage medium, sensors, and so on. These components are housed in a portable housing that is below a size needed to accommodate an input/output (I/O) component for providing access to the full functionality of the hardware fob device. This allows the hardware fob to remain a small size. Without the need to include specific I/O components, the portable housing of the hardware fob may also be shaped according to the usage, rather than the I/O component. For example, the hardware fob may be shaped as a bracelet.

To perform I/O operations with the hardware fob, the hardware fob pairs with one or more modular extension devices. Each modular extension device extends the functionality of the hardware fob. Examples of a modular extension device include a touchscreen, display, keyboard, camera, charging dock, extended battery, and so on. These modular extension devices allow access for a user to the full functionality of the hardware fob.

When the hardware fob receives a pairing request from the modular extension device (e.g., via the wireless interface of the hardware fob), the hardware fob pairs with the modular extension device. The pairing may involve verifying the authenticity of the modular extension device. The hardware fob also provides input and/or output interfaces to the modular extension device based on the form factor and configuration of the modular extension device. For example, if the modular extension device is a display with a particular resolution, the hardware fob would provide a display output to the modular extension device according to that resolution.

When the hardware fob encounters additional modular extension devices, it may automatically pair with these additional devices. When pairing with a new device, the hardware fob may unpair with an old device, or may extend the interface from the old device onto the new device, such that the two devices may offer a unified functionality. For example, if the modular extension device is a camera, the hardware fob may pair with another camera and use both cameras to capture more detailed images, or simultaneously capture at different focal lengths, and so on.

The hardware fob may also provide identification capabilities to identify a user. This may be achieved using a biometric sensor on the hardware fob. For example, the hardware fob may include a fingerprint sensor, and upon receiving a request for authentication from an authentication terminal (e.g., from a payment terminal), the hardware fob may request that the user verify his or her fingerprint, and upon verification, communicate with the authentication terminal to verify the user.

Using this method, a user may simply carry around his or her hardware fob, and does not need to carry around a display, keyboard, or other item. This is in contrast to the current state of the art, where users must carry around a large mobile device, such as a "phablet," that includes a screen, touch interface, camera, and all the I/O components needed to interact with the mobile device. A user can instead have a set of modular extension devices at multiple locations, and simply bring the hardware fob to these locations, upon which the hardware fob will automatically pair with these devices, allowing a seamless transition between one location and the next. Furthermore, as the modular extension devices are separate from the hardware fob itself and separate from each other, a user may independently upgrade each modular extension device without having to upgrade everything else, as would be the case with current mobile devices. For example, the user may easily replace a modular camera module with a new device without having to replace the entire hardware fob. Additionally, for a device manufacturer, any certification process may be simplified, as only a subset of components of a mobile device would need to be certified upon release of a new modular extension device or hardware fob.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
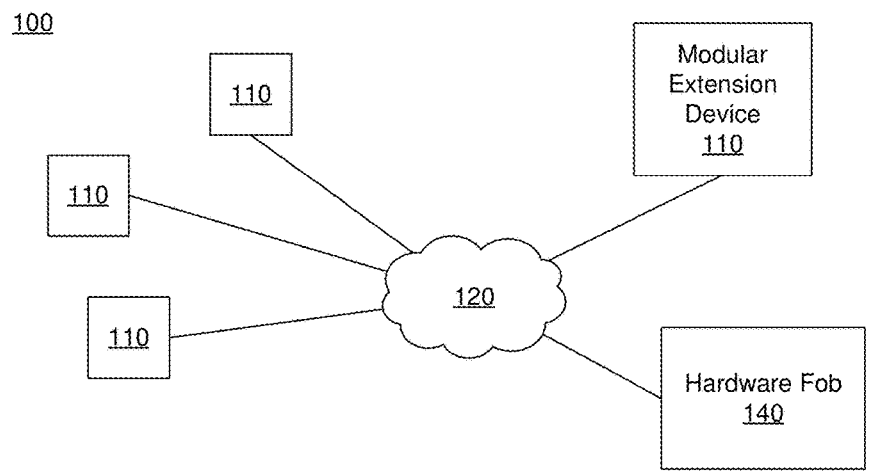
FIG. 1 is a block diagram of a system environment for a device ecosystem for a mobile hardware fob, in accordance with an embodiment of the invention.

FIG. 1 is a block diagram of a system environment 100 for a device ecosystem for a mobile hardware fob, in accordance with an embodiment of the invention. The system environment 100 shown by FIG. 1 comprises one or more modular extension devices 110, a network 120, and the hardware fob 140. In alternative configurations, different and/or additional components may be included in the system environment 100.

The hardware fob 140 is a small form factor device that is able to communicate with one or more modular extension devices 110 across a network 120. The hardware fob 140 itself does not include any hardware components that allow a user to access the full functionality of the hardware fob 140. Instead, the hardware fob 140 pairs with the modular extension devices 110 to extend the functionality of the hardware fob 140. This extended functionality is any function that the hardware fob 140 does not have by itself. Particularly, some of the modular extension devices 110 provide input and output (I/O) functions to the hardware fob 140 that allow access the full functionality of the hardware fob device 140. This allows the hardware fob 140 to be of a small form factor, with a physical housing that is of a size that does not need to be able to accommodate any I/O components.

Within the housing of the hardware fob 140 are the core components that allow the hardware fob 140 to communicate and interface with the modular extension devices 110. These components may include a mobile processor, storage medium, non-volatile memory, a rechargeable battery, a charging interface, a wireless network interface, and other core components needed for the hardware fob 140 to function as a computing device. In particular, the hardware fob 140 itself stores the program instructions that provide its functionality and the user data for the user of the hardware fob 140.

When the hardware fob 140 encounters a modular extension device 110, the hardware fob 140 may receive a request from the modular extension device 110 to pair with it via a wireless interface. Upon pairing with the modular extension device 110, the hardware fob 140 provides input and/or output interfaces to the modular extension device 110 that are customized based on the type of the modular extension device 110. The interface allows the hardware fob 140 to communicate with the particular modular extension device 110. In one embodiment, the interface translates data between the hardware fob 140 and the paired modular extension device 110. For example, an input interface translates data received from an input modular extension device 110 to data that can be understood by the hardware fob 140, and an output interface translates between data sent by the hardware fob 140 and data that can be understood by the modular extension device 110.

After pairing, the hardware fob 140 can send output and/or receive input from the user via the modular extension devices 110. This provides the user with the ability to access the full functionality of the hardware fob 140.

The hardware fob 140, upon being moved to a new environment, can pair automatically with the surrounding the modular extension devices 110 that are present at the new environment. For example, upon moving the hardware fob 140 from a home location to a work location, the hardware fob 140 may pair with the modular extension devices 110 at the work location, such as a display, keyboard, printer, and so on. When pairing with the display, the hardware fob 140 provides an output interface to the display that adheres to the correct screen dimensions, resolutions, and other characteristics of the display.

When the user wishes to add new functionality to the hardware fob 140, that user may simply pair a modular extension device 110 that has that functionality to the hardware fob 140. For example, if a user wished to take a photograph, the user could pair a camera modular extension device 110 to the hardware fob 140. Upon receiving a paring request from the camera, the hardware fob 140 indicates to the camera the correct interface to use to communicate the photos and videos taken by the camera to the hardware fob 140.

When combined with the modular extension devices 110, the full functionality of the hardware fob 140 may be similar to the functionality of a typical computing device. However, the advantage of the hardware fob 140 is that it does not include the ability to directly access this full functionality by itself. Although this may seem counterintuitive, it produces an unexpected benefit. As the hardware fob 140 is not physically coupled with any of the modular extension devices 110, unlike in the case of a traditional computing device, a user may upgrade or replace the modular extension devices 110 without having to replace the hardware fob 140 as well. This provides convenience for the user as the user does not need transfer the user data from the hardware fob 140 to a new one, and it also saves in expenses as the user only needs to purchase a new modular extension device 140 without having to purchase the core components needed to interface with the modular extension device 110, as these are housed in the hardware fob 140. Additionally, the hardware fob 140 has the ability to pair with an unlimited number of the modular extension devices 110 in a device ecosystem. This allows a user to easily add to the functionality of the hardware fob 140. Furthermore, unlike a typical computing device that includes large built in input and output components, the hardware fob 140 has a small form factor, making it highly portable.

The modular extension devices 110 are hardware components that extend the functionality of the hardware fob 140. A modular extension device 110 must pair with the hardware fob 140 to achieve its intended functionality. Without pairing with the hardware fob 110, the modular extension device 110 is not operative.

In one embodiment, a modular extension device 110 provides input functionality to the hardware fob 140. Input types may be tactile, aural, electromagnetic, force-based, position-based, and so on. Some examples of the modular extension devices 110 that provide input functionality are a touchscreen, an audio input device, a keyboard, a mouse, a video capture device, a 3D scanning device (e.g., a LIDAR device), a wireless interface adapter, a wired interface adapter, a biometric verification device, buttons or other physical inputs, and sensors such as a gyroscope, accelerometer, magnetometer, thermometer, barometer, heart rate monitor, and/or step counter.

In one embodiment, a modular extension device 110 provides output functionality to the hardware fob 140. Output types may be visual, aural, tactile, and so on. Some examples of the modular extension devices 110 that provide output functionality are a speaker, a display, a haptic feedback device, a lighted indicator (e.g., an LED), a game controller, a servo, and so on.

In one embodiment, a modular extension device 110 provides other functionality to the hardware fob 140. These modular extension devices 110 may not provide input or output for the hardware fob 140, however they nevertheless extend the functionality of the hardware fob 140. Examples of such modular extension devices 110 include an extended battery pack, a wireless charging base, housings, a lock, and so on.

In one embodiment, a modular extension device 110 provides a combination of input, output, and/or other functionality as described above.

The modular extension devices 110 may be of different form factors. In one embodiment, the form factor of each modular extension device 110 is customized for the function of the modular extension device 110. For example, the form factor of the modular extension device 110 may be that of a case for the hardware fob 140, or may include an antenna for wireless communication.

The modular extension device 110 may also be a set of computer instructions (e.g., a software application) executing on a mobile computing device, such as a smartphone. While the mobile computing device cannot natively communicate with the hardware fob 140, by executing the computer instructions (e.g., in a forwards compatibility application), the mobile computing device may act as a modular extension device 110, allowing the hardware fob 140 to access the hardware components of the mobile computing device.

In one embodiment, the modular extension device 110 may be a component in an Internet of Things (TOT) network. For example, the modular extension device 110 may be a smart thermostat, a biochip within the user, and so on.

In one embodiment, the modular extension devices 110 that provide input and/or output functionality have stored within them a profile indicating to the hardware fob 140 how to configure an input and/or output interface to interface with the modular extension device 110. This profile may include configuration parameters and/or program instructions that instruct the hardware fob 140 on how to configure the interface.

The configuration parameters may describe the properties of the modular extension device 110 that the hardware fob 140 needs to know in order to configure the interface for that modular extension device 110. For example, a display modular extension device 110 may include as properties the viewable dimensions of the display, the screen resolution of the display, the video formats supported by the display, the refresh rates supported by the display, the display technology, and so on. For every category of modular extension device 110, the hardware fob 140 and the modular extension devices 110 in the category may support a standardized set of configuration parameters that allows any modular extension device 110 of that category to easily interface with the hardware fob 140 by including the standardized set of configuration parameters.

The program instructions may be computer readable instructions that need to be executed by the hardware fob 140 in order for the hardware fob 140 to interface with the modular extension device 110. The program instructions may take the form of a device driver. This allows the modular extension device 110 to offer specialized functionality or optimizations not supportable by simply using configuration parameters. In other cases, the computer readable instructions may not be human-readable and allows a manufacturer to provide proprietary interfaces and prevent other manufacturers from easily copying these interfaces. For example, an input modular extension device 110 may provide extended graphics acceleration for the hardware fob 140. As such a graphics accelerator device may require low latency and high bandwidth communication with the hardware fob 140, the extended graphics device may provide program instructions that the hardware device may execute to satisfy these special requirements instead of using only standardized parameters.

In one embodiment, the profile of each modular extension device 110 also includes metadata regarding that modular extension device 110, such as a hardware identifier, manufacturer name, model name, model number, serial number, description of functionality, and/or other information. This allows the hardware fob 140 to display the metadata information to a user when a user requests the hardware fob 140 pair with the available modular extension devices 110.

The network 120 uses any wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In one embodiment, all or some of the communication links of the network 120 may be encrypted using any suitable technique or techniques.

In one embodiment, a cloud server (not shown) may be communicatively coupled to the network 120 and allow the hardware fob 140 to offload heavy compute or processing tasks to the cloud server.

Figure 2:
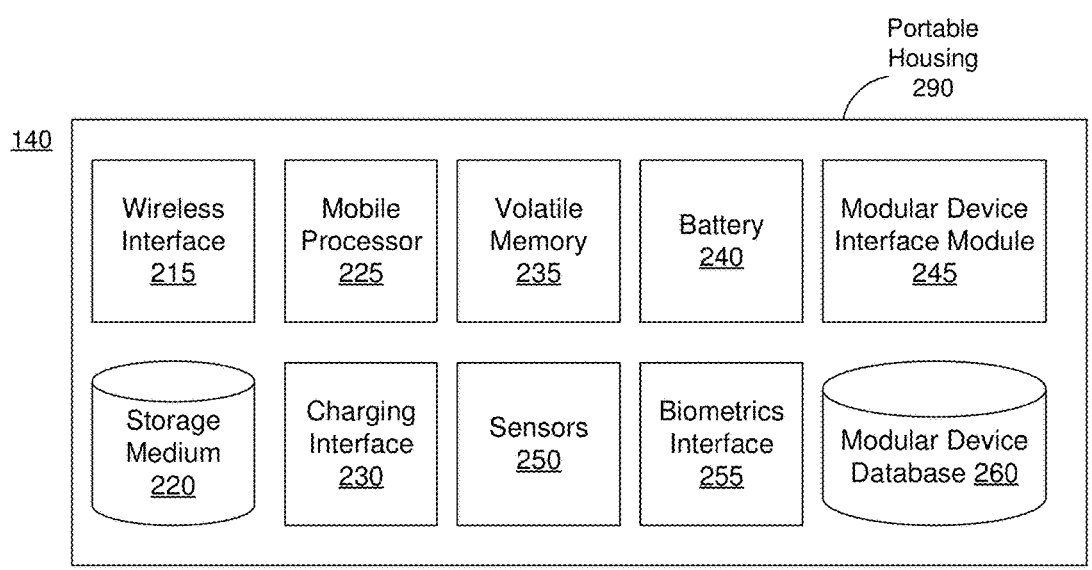
FIG. 2 is a block diagram of a hardware fob as shown from FIG. 1, in accordance with an embodiment of the invention.

FIG. 2 is a block diagram of a hardware fob 140 as shown from FIG. 1, in accordance with an embodiment of the invention. The hardware fob 140 shown in FIG. 2 comprises a portable housing 290, a battery 240, a charging interface 230, sensors 250, a wireless interface 215, a storage medium 220, a volatile memory 235, a mobile processor 225, a biometrics interface 255, a modular device database 260, and a modular device interface module 245. In alternative configurations, different and/or additional components may be included in the hardware fob 140.

The portable housing 290 includes the contents of the hardware fob 140. I/O components require a certain size in order to be able to interface with a human user. For example, a tactile input component must have a size large enough to accommodate one or more digits of the human hand. A display component must be large enough to display information that is discernible and individually distinguishable by a human eye. The portable housing 290 has dimensions that are below a threshold size needed to accommodate any of these I/O components to provide access to the full functionality of the hardware fob 140. In other words, due to its size, the portable housing 290 does not accommodate any of these types of I/O components. Thus, the portable housing 290 can be as small as a size needed (or possible) to house the contents of the hardware fob 140 without having to accommodate the I/O components. For example, the size of the portable housing 290 may range up to 70 mm in width, 40 mm in height, and 20 mm in depth.

Furthermore, many I/O devices used to interface with humans have strict dimensional (i.e., shape) requirements in order to be usable by a human. For example, a display may have to have a certain width to height ratio. As the portable housing 290 can be of a small size and does not need to accommodate the more strict dimensions of these I/O devices, the portable housing 290 can be variously shaped. In one embodiment, the portable housing 290 is shaped so that it can be worn on a human body. For example, the portable housing may be a bracelet, ring, necklace, pendant, eyeglasses, or other shape that can be attached on a human. The portable housing 290 may also be shaped such that it may fit within a larger appliance or modular extension device 110. For example, a modular extension device 110 may have a slot to insert the hardware fob 140 into, which recharges the hardware fob 140 and causes it to automatically pair with the modular extension device.

The portable housing 290 may be made of various materials. These materials may be plastic, metal, man-made, or naturally-sourced. In one embodiment, the portable housing 290 also provides structural support for the contents of the hardware fob 140. In such a case, the material of the portable housing 290 is strong enough to be able to structurally support the components. In one embodiment, the material is of a strength that is able to withstand stresses and loads up to a certain threshold. In one embodiment, the material of the portable housing 290 includes at least a radio-transparent section. In one embodiment, the material of the portable housing 290 has a high thermal conductivity, allowing the material to act as a heatsink for any heat generated by the components inside the portable housing 290. In one embodiment, the portable housing 290 is composed of more than one layer coupled together using an adhesive or other connector (e.g., a screw). The external layer of the portable housing 290 may have a material that is comfortable to human touch (e.g., a soft fabric, a soft plastic, leather, wood, or a soft rubber).

In one embodiment, the portable housing 290 is also resistant to intrusion from outside contaminants, such as liquids and particulate matter. This may be achieved through the use of special seals, pressure resistant materials, and so on.

In one embodiment the exterior of the portable housing 290 includes one or more openings to allow for components within the hardware fob 140 to interface externally. The openings may be used for one or more indicators, a power switch/button, a wired connection, an antenna, and so on. These openings may be protected with a cover or other component to prevent any outside contaminants from entering the hardware fob 140. In another embodiment, the portable housing 290 does not include openings, and the interfaces with the hardware fob 140 rely on capacitive buttons, wireless communications, and other methods that do not require an opening to be made.

The battery 240 provides a power source for the hardware fob 140. In one embodiment, the battery 240 is a rechargeable battery that uses any high-density rechargeable battery technology. These may include lithium ion, lithium ion polymer, thin film lithium ion, and other technologies. In one embodiment, the battery 240 also includes a non-rechargeable battery element, in order to maintain certain functions, such as a digital clock, when the rechargeable battery element is depleted. Although the battery 240 may be of a small capacity due to the smaller size of the portable housing 290, it can still provide sufficient battery life for the hardware fob 140 as the hardware fob 140 does not include many components that have high power drain, such as a high-resolution display.

The charging interface 230 charges the battery 240 using an external power source. In one embodiment, the charging interface 230 uses wireless charging, such as electromagnetic induction, laser-based recharging, or other wireless recharging technology, to charge the battery 240. In one embodiment, the charging interface 230 uses a wired recharging solution.

The sensors 250 are small form factor sensors that are able to detect various items of environmental information for the hardware fob 140. Such items describe the situation and conditions surrounding the hardware fob 140 and may include temperature, geographic location, position in 3D space, acceleration, altitude, ambient light levels, and so on. These may be accomplished by sensors such as a thermometer, global positioning system (GPS) device, accelerometer, gyroscope, magnetometer, barometer, light sensor, and so on.

In one embodiment, the sensors 250 are of a very small size that do not appreciably add to the total volume of the components in the hardware fob 140. Such sensors 250 may be piezoelectric in nature (e.g., a piezoelectric accelerometer), or may already be included with one of the other components of the hardware fob (e.g., a GPS sensor included within the mobile processor 225 as a system on a chip).

The storage medium 220 is a secondary storage that is non-volatile and stores the computer-readable instructions, user data, configuration settings, and other data for the hardware fob 140. The storage medium 220 may be comprised of solid state storage media (e.g., eMMC) or other small form factor storage medium.

The volatile memory 235 is a primary storage device directly accessible by the mobile processor 225 via a memory bus. The volatile memory 235 stores any current computer instructions loaded from the storage medium 220 by the mobile processor 225. The volatile memory 225 may be comprised of low power dynamic random access memory (DRAM).

The mobile processor 225 is a central processing unit (CPU) that executes computer readable instructions from the volatile memory 235 which have been loaded from the storage medium 220. The mobile processor 225 may have various power saving features, such as low power states and clock gating. The mobile processor 225 may have one, two, three, four, or many cores. Each core may have a high-speed cache, as well as one or more floating point and arithmetic logic units.

In one embodiment, the hardware fob 140 includes a biometrics interface 255 that can collect biometric information from a user of the hardware fob 140. In some embodiments, the hardware fob 140 can act as a mobile identity platform to authenticate the identity of a user in possession of the hardware fob 140. To authenticate the identity of the user, in one embodiment, the biometrics interface 255 includes a biometric sensor, such as a fingerprint sensor, voiceprint recognition sensor, iris recognition sensor, or a combination of different biometric sensors. In one embodiment, the biometrics interface 255 interfaces with external sensors via the wireless interface 215. In some embodiments, the biometrics interface 255 interfaces with sensors 250 to receive the biometric information from the user. After receiving the biometric information from the user, the biometrics interface 255 may authenticate the user with an authentication server. This causes the user to be authorized at various authentication terminals that require positive user identification. Examples of such authentication terminals include a vehicle requiring owner verification, a security station at an airport, and a mobile payment system terminal. Thus, the biometrics interface 255 extends the functionality of the hardware fob 140 to be a mobile identity platform that is always with the user.

In one embodiment, the hardware fob 140 is used as part of a two-factor authentication process for a service, such as a website, virtual private networking (VPN) service, automated teller machine (ATM), a payment terminal (i.e., a point of sale terminal), and so on. After the first component of the service authenticates the user using a first security feature (e.g., a password, personal identification number (PIN), smart card, bank card, etc.), the hardware fob 140 may be used to authenticate the user using a second security feature. When authenticating the user, the hardware fob 140 may in some cases require the user to authenticate using an input to the hardware fob 140 or a modular extension device. This input may include a PIN, voice print, biometric information, and so on. The hardware fob 140 may then submit this to the service (via the network or using local communications). The hardware fob 140 may instead (or additionally) provide the user with a uniquely generated value, key, barcode (e.g., a matrix barcode), or other item for which the user may be able to copy or transfer to an input field provided by the service (i.e., the hardware fob 140 acts as a hardware token). The value generated by the hardware token 140 for the user to enter may also include information entered by the user to the hardware fob 140, such as the aforementioned PIN, biometric information, and so on.

In one embodiment, the hardware fob 140 also includes one or more user interface components. These user interface components may include indicators, microphones, a miniature light-field display, and so on. The user interface components are designed to fit within the dimensions of the portable housing 290. Although these interface mechanisms provide output or input, due to their size they are unable to provide access to the full functionality of the hardware fob 140, and can only provide limited functionality and/or information. For example, they may provide basic status information, such as battery life, error messages, and so on. In one embodiment, the user interface components include a pinhole microphone that can receive simple voice commands from the user. The response to the voice command may be delivered via a small display providing limited information on the hardware fob 140 or via a miniature form factor speaker. For example, the small display may just be large enough to indicate "OK" to the user. This allows rudimentary communication with the hardware fob 140 when a modular extension device 110 is not readily available for paring.

In some embodiments, the hardware fob 140 includes a modular device database 260 that stores profiles of modular extension devices 110. These may be profiles of modular extension devices 110 that the hardware fob 140 has previously paired with or a selected list of modular extension devices 110 in the market. Each model, type, or category of modular extension device 110 may have a separate profile. Each profile for a modular extension device 110 stores the information used by the hardware fob 140 to provide an interface for that modular extension device 110. In some embodiments, each profile includes a type of the modular extension device 110, metadata for the modular extension device 110, and configuration parameters and/or program instructions as described above. When the hardware fob 140 pairs with a modular extension device 110, the modular extension device 110 may send a hardware identifier which the hardware fob 140 uses to look up the corresponding profile in the modular device database 260. The hardware fob 140 can then provide the proper interface to the modular extension device 110 based on that profile information.

Each profile may also store specific information regarding specific modular extension devices 110 with which the hardware fob 140 has previously paired. This information may include a communications log, identification information for the previously paired modular extension device 110 to identify the modular extension device 110 when it is encountered again, and so on.

In some embodiments, the profiles for each modular extension device 110 also include additional security and authentication protocols to authenticate the identity of the modular extension devices 110. For example, the hardware fob 140 may use public key cryptography to authenticate the identity of a modular extension device 110, with public and private keys store in the profile. This may ensure that the hardware fob 140 does not pair with a malicious modular extension device 110 masquerading as the legitimate modular extension device 110.

The wireless interface 215 allows the components of the hardware fob 140 to communicate with the modular extension devices 110 and other computing devices using the network 120. The wireless interface 215 uses one or more wireless interfaces to wirelessly couple the hardware fob 140 to a wide area network (WAN) such as the Internet. In one embodiment, the wireless interface 215 uses the same or a different wireless interfaces to communicate with the modular extension devices 110. Examples of interfaces that the wireless interface 215 may support include WiFi™, Bluetooth®, Zigbee®, Z-Wave®, and cellular interfaces such as LTE and 3G (e.g., HSPA+). In one embodiment, the wireless interface 215 is wirelessly coupled with a modular extension device 110 that provides additional wireless interface functionality by supporting a newer wireless interface format that is not supported by the wireless interface 215 or by providing a high gain antenna.

When the hardware fob 140 receives a pairing request from a modular extension device 110 (e.g., via a broadcast message), the wireless interface 215 communicates with the modular extension device 110 to initiate a pairing process. To pair with the modular extension device 110, the wireless interface 215 may first verify the wireless communications protocols that the modular extension device 110 supports (e.g., WiFi™, Bluetooth®, etc.). The wireless interface 215 may then select a protocol based on bandwidth, power, interference, and other requirements. In one embodiment, the wireless interface 215 chooses a lower power interface when running in a power save mode.

In some cases, the wireless interface 215 also validates the authenticity information of the modular extension device 110. This may occur when secure data is to be transmitted to the modular extension device 110, or when data with attached digital rights are to be transmitted to the modular extension device 110. To validate the authenticity of the device, the wireless looks up authenticity information in the modular device database 260, and uses this information to verify the authenticity of the modular extension device 110. For example, the authenticity may be verified by receiving a digital certificate from the modular extension device 110 and verifying the authenticity of the certificate with a certificate store stored on the hardware fob 140. After paring with the modular extension device 110, the wireless interface 215 establishes a session with the modular extension device 110 and transmits and receives data to and from the modular extension device 110 as needed by the other components of the hardware fob 140.

When the hardware fob 140 encounters a modular extension device 110 that it has not previously paired with, the wireless interface 215 may further wait for the user to input an acknowledgement or other indicator indicating that the user does wish to pair with that modular extension device 110. The serial number or other unique identifier (e.g., a Bluetooth media access control (MAC) address) for that modular extension device 110 is then stored by the wireless interface 215 in the modular device database 260, and upon subsequent pairings with the same modular extension device 110, the wireless interface 215 verifies this unique identifier before automatically pairing with the modular extension device 110.

In one embodiment, the pairing process may be the same as an existing pairing process for a standard wireless communications protocol, such as the pairing process in Bluetooth.

The modular device interface module 245 interfaces with modular extension devices 110. In one embodiment, the modular device interface module 245 is implemented in program instructions stored in the storage medium 220 and executed by the mobile processor 225.

In one embodiment, the modular device interface module 245 provides an interface to modular extension devices 110 with which the hardware fob 140 has paired. Once the hardware fob 140 pairs with a modular extension device 110, the modular device interface module 245 receives a profile for the modular extension device 110 from the modular extension device 110 or retrieves the profile for the modular extension device 110 from the modular device database 260. Using the configuration parameters or program instructions in the profile, the modular device interface module 245 is able to provide the proper interface to the paired modular extension device 110.

In one embodiment, the modular device interface module 245 performs seamless handovers between different modular extension devices 110. When the hardware fob 140 detects another modular extension device 110, the modular device interface module 245 determines whether the hardware fob 140 has previously paired with that modular extension device 110 using information in the modular device database 260. Once the modular device interface module 245 determines that the modular extension device 110 has been encountered before, the modular device interface module 245 may instruct the wireless interface 215 to automatically pair with the modular extension device 110.

Additional details regarding the methods of the modular device interface module 245 in the hardware fob 140 are described below with reference to FIGS. 3 and 4.

Pairing and Handover with Modular Extension Devices

Figure 3:
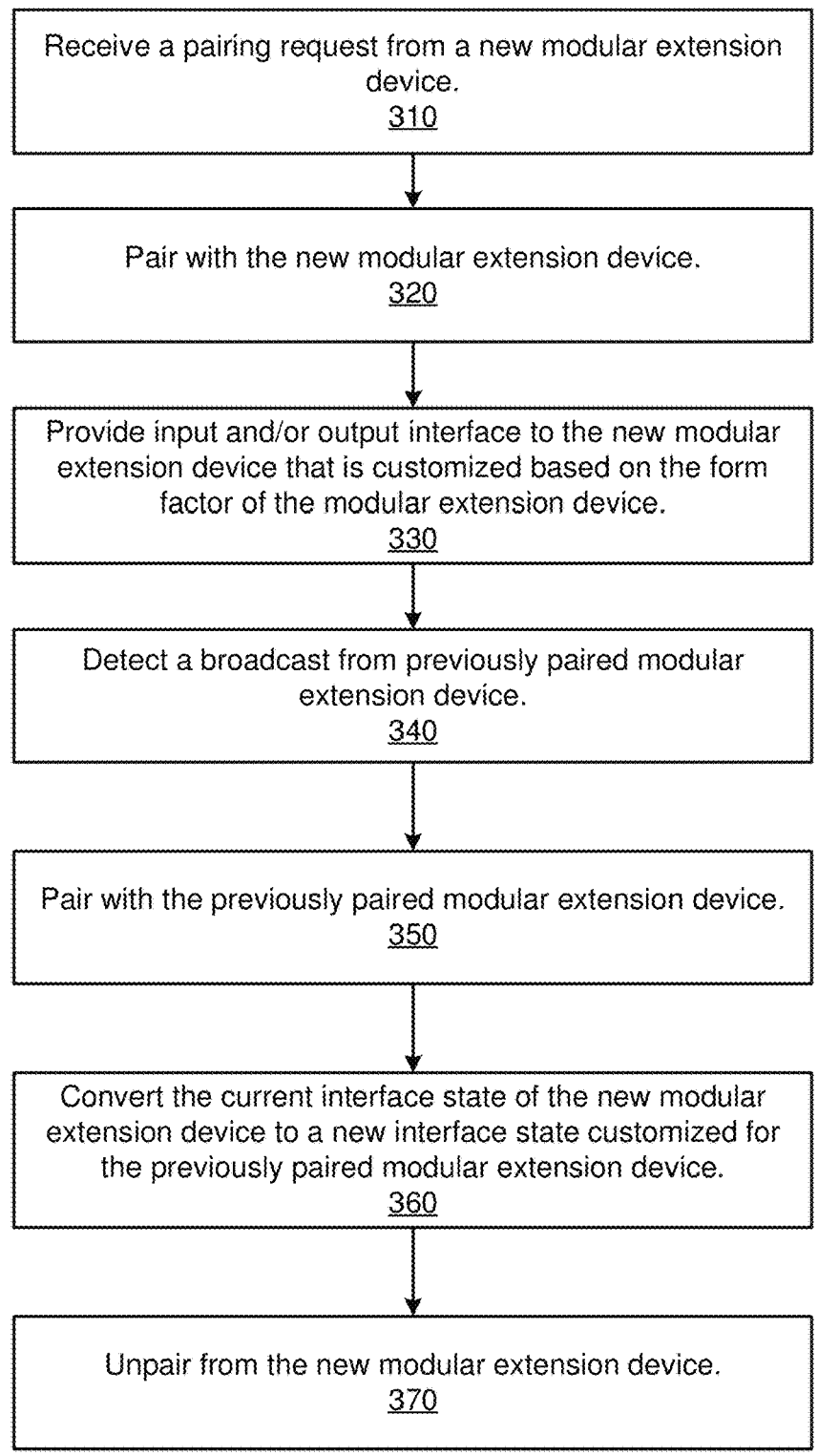
FIG. 3 is a flowchart illustrating a method 300 for pairing with modular extension device and for handover to a previously paired modular extension, in accordance with an embodiment of the invention.

FIG. 3 is a flowchart illustrating a method 300 for pairing with modular extension device and for handover to a previously paired modular extension, in accordance with an embodiment of the invention. In some embodiments, the operations in method 300 are performed by the modular device interface module 245 of the hardware fob 140. In some embodiments, the operations that are performed are different and/or have a different order.

Initially, the hardware fob 140 receives 310 a pairing request from a new modular extension device 110. In one embodiment, this pairing request is a broadcast message sent using a previously agreed upon protocol (e.g., Bluetooth). Once the hardware fob 140 receives the broadcast message (that includes a hardware identifier of the requestor), it may respond with its own hardware identifier (e.g., a hardware address) and other identifying information (e.g., a name). Once the two devices have exchanged hardware identifiers, the hardware fob 140 and modular extension device 110 may exchange unicast messages to complete the pairing process. This may include exchanging authentication information and profile information as described above. This allows the hardware fob 140 to pair 320 with the new modular extension device 110.

In one embodiment, the hardware fob 140 receives a pairing request from another hardware fob 140. The second hardware fob 140 also sends authentication information, such as identity information that may be verified using a public key infrastructure system. Once the first hardware fob 140 verifies the identity of the second hardware fob 140, which may require querying the user of the first hardware fob 140 for permission, the first hardware fob 140 pairs with the second hardware fob 140. By pairing with a second hardware fob 140, the first hardware fob 140 can communicate data with the other hardware fob 140. Furthermore, the first hardware fob 140 may be able to output to and receive input from the modular extension devices 110 paired with the second hardware fob.

After pairing, the hardware fob 140 provides 330 input and/or output interfaces to the new modular extension device that is customized based on the form factor of the modular extension device 110. In one embodiment, the hardware fob 140 creates the interface based on the configuration instructions associated with a profile for the modular extension device 110 as described above. In one embodiment, the hardware fob 140 executes the program instructions stored within the profile for the modular extension device 110 as described above.

Figure 4:
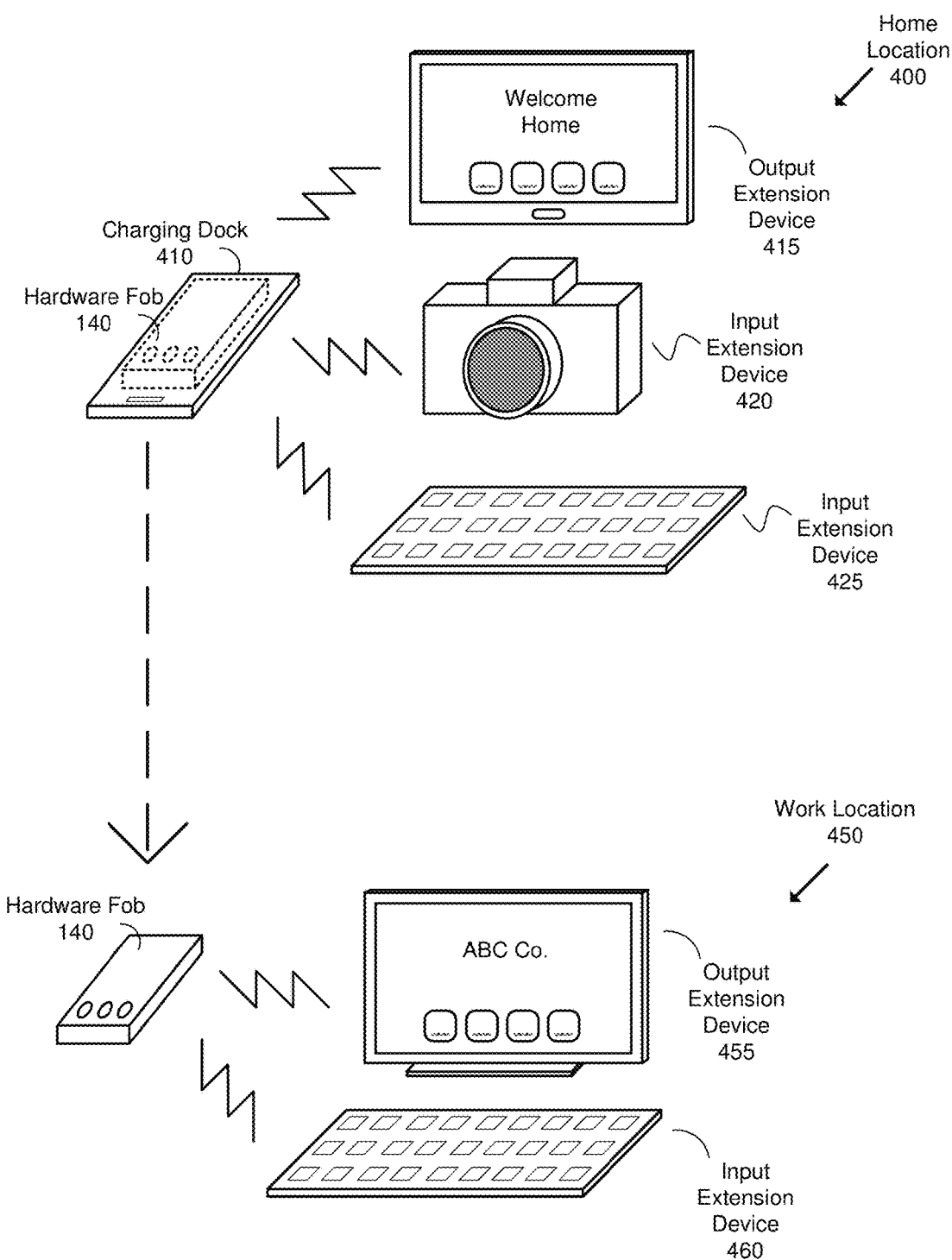
FIG. 4 illustrates a pairing scenario, in accordance with an embodiment of the invention.

FIG. 4 illustrates an example of a pairing scenario as described here. Initially, the hardware fob 140 is at the home location 400. Note that FIG. 4 is not drawn to scale and the hardware fob 140 is smaller in relative scale to the illustrated devices than depicted. While at the home location, the hardware fob 140 is wirelessly coupled to a charging dock 410 to charge the battery of the hardware fob 140. In addition, the hardware fob 140 has paired with an output modular extension device 415, and two input modular extension devices 425. In the illustrated example, these are a display, a camera, and a keyboard. By pairing with these devices, a user may then access the full functionality of the hardware fob 140 by being able to provide input via the input modular extension devices and receive output via the output modular extension devices.

Referring back to FIG. 3, the hardware fob 140 may then detect 340 a broadcast from previously paired modular extension device 110 (hereinafter referred to as the "second modular extension device"). The second modular extension device 110 is a device to which the hardware fob 140 has previously paired. This means that the hardware fob 140 has already previously authenticated the second modular device 110 and has received an indication from the user that this is a device for which the hardware fob 140 should pair with if encountered.

Subsequently, the hardware fob 140 pairs 350 with the second modular extension device 110. In some embodiments, as the hardware fob 140 has previously paired with this second modular extension device 110, the hardware fob 140 has stored authentication information for this second modular extension device 110 in a profile. Thus, the hardware fob 140 can automatically pair with this second modular extension device 110 if the hardware fob 140 receives a pairing request.

In some embodiments, the hardware fob 140 actively sends a broadcast message identifying the hardware fob 140. If received by a modular extension device 110, the modular extension device 110 may send a pairing request to the hardware fob 140. After receiving the pairing request, the hardware fob 140 pairs with the modular extension device 110 as described above.

After pairing with the second modular extension device 110, the hardware fob converts the current interface state for the current modular extension device 110 to a new interface state customized for the second modular extension device 110. An interface state describes the current parameters of the interface as observed by the user of the associated modular extension device 110. In the case of an output modular extension device 110, the state may be the current output of the device. In the case of an input modular extension device 110, the state may be the current configuration settings of the device.

The properties of the new modular extension device 110 may differ in many ways from the previous device. However, the hardware fob 140 may convert the interface state such that to the user, the changes are as minimal as possible given the change in device properties.

The state of the interface may be represented by computer instructions and data variables within the interface. When converting from one state to another, the hardware fob 140 may modify these variables of one state to corresponding variables of another state. For example, the current display output on a display device may be defined by variable such as resolution, coordinates for UI elements that are displayed, color depth, resolution scale (e.g., dots per inch), and so on. When converting to a new display, the hardware fob 140 may convert the values of variables to new values representing the properties of the new display, based on one or more rules.

In one embodiment, the hardware fob 140 extends onto the newly paired modular extension device the state of the interface provided to a currently paired modular extension device 110 of the same type. In other words, the hardware fob 140 sends an interface to the newly paired modular extension device 110 that combines the functionality of the two modular extension devices 110 into a single functional unit. In the case where the modular extension devices 110 are display devices, the hardware fob 140 may present the interface to both devices such that they act as a single functional unit representing one unified display (e.g., by extending the output onto both displays). In other cases, the hardware fob 140 presents the interface to the two modular extension devices 110 of the same type that unifies the two devices into a single functional element, but which may have added functionality. In other words, the two devices are made to function together to achieve a single purpose. For example, two microphone devices could be combined to create directional microphone, and multiple speaker devices could be combined to create 3D audio output. Although two modular extension devices 110 are described here, in other embodiments the hardware fob 140 can extend the interface state onto more than two modular extension devices 110.

In another embodiment, the hardware fob 140 unpairs 370 automatically from one or more of the currently paired devices after pairing with the new device, and transfers the interface from the old device to a new interface for the new device, such that the new device represents the state of the old device.

Referring back to FIG. 4, the hardware fob 140 is later moved to the work location 450. The work location includes an output extension device 455 and an input extension device 460. These are a display and keyboard, respectively. Note that these do not have to be the same display or keyboard as the ones at the home location. The hardware fob 140, upon detecting or receiving a pairing request from these modular extension devices 110 at the work location 450, automatically pairs with them as the hardware fob 140 has encountered these devices before. After pairing with these devices, the hardware fob 140 presents an interface to them that converts the interface state that was presented to the modular extension devices 110 at home location 400 to the applicable modular extension devices 110 at the work location 450. As noted above, when converting the interface state, the hardware fob 140 adapts the state to the profile of the new modular extension device 110 while keeping the user-perceived differences as small as possible.

Thus, the state of the interface on the output extension device 415 is converted to an interface compatible with the output extension device 455 so that the same output state is shown on the output extension device 455. If the resolution or aspect ratio of the output extension device 455 is different, the hardware fob 140 may preserve the state in the original interface as close as possible by changing the resolution scale of the elements that are displayed, and/or preserving the original aspect ratio by placing black bars on the output extension device 455 that border the displayed image. The state of the interface on the input extension device 425 is converted in a similar fashion for the input extension device 460, such that the same settings (e.g., caps lock on/off, key mapping) are presented in the interface for the input extension device 460.

In some embodiments, the hardware fob 140 also modifies the converted interface state depending on the location of the hardware fob 140. For example, the hardware fob 140 may additionally indicate on the output extension device 455 various work related tasks if the user has moved to a work location.

As another example of a pairing scenario, a user with the hardware fob 140 may enter his or her vehicle. The vehicle, and specifically a computing device of the vehicle, being a modular extension device 110, pairs with the hardware fob 140, and the hardware fob 140 provides the vehicle with the user's identity and various settings and preferences for the user (e.g., music settings, seat settings, last destination location for navigation system, etc.), and the vehicle may customize the vehicle based on those settings (e.g., adjust seat position to the seat settings, adjust in-car entertainment system to music settings, etc.).

As yet another example of a pairing scenario, a user with a hardware fob 140 may move within the vicinity of a house. Various items within the house may act as modular extension devices 110. For example, the lock on the door may be a modular extension device 110, and pairs with the hardware fob 140. After verifying the identity of the user of the hardware fob 140 using the various methods of authentication described above, the door may unlock for the user. Other modular extension devices 110 in the home, such as a lighting control, heating and cooling control devices, audio playback devices, televisions, kitchen appliances, and so on, may also automatically pair with the hardware fob 140, verify the user, and perform some preconfigured action based on the characteristics of the device (e.g., turn on lighting, turn on music, etc.).

This seamless transition presents very little disruption to a user. In a traditional environment, a user must carry two different computing devices with each device having varying settings, user data, and so on. This is because each environment has different computing requirements, and requires different computing devices with different hardware components. Instead, with the hardware fob 140 and the device ecosystem described here, a user may easily transition to and from modular extension devices 110 at various locations while operating on the same settings and user data. The different requirements of each environment can be solved using a different set of modular extension devices 110. This allows the user to quickly pick up at work with the exact same activity he or she was performing at home using the hardware fob 140. As the hardware fob 140 is of a small and portable form factor, the user may easily carry it to and from these different locations with ease.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A first fob device comprising:
a portable housing below a threshold size, the threshold size being a size of the portable housing below which an input/output component cannot be integrated into the portable housing due to a size of the portable housing being smaller than a size of the input/output component, the input/output component extending a functionality for the first fob device to allow a user to execute a function of the first fob device that would not otherwise be available to the user due to the size of the portable housing, the portable housing including contents comprising:
a mobile processor;
a non-transitory computer-readable storage medium having instructions, the instructions when executed by the mobile processor cause the mobile processor to perform operations comprising:
providing input and output interfaces to one or more paired modular extension devices that are customized for each of the one or more paired modular extension devices, the input and output interfaces customized to access an additional functionality provided by the one or more paired modular extension devices for the first fob device;
detecting a pairing request from a second fob device;
determining whether an identity information of the second fob device is authentic using public key cryptography;
in response to determining that the identity information of the second fob device is authentic, prompting a user of the first fob device via the built-in output interface to determine whether the paring request should be granted; and
in response to receiving an input from the user via the built-in input interface that the pairing request should be granted, receiving input data from one or more modular extension devices paired with the second hardware fob via the second hardware fob, and transmitting output data to the second hardware fob for output to one or more modular extension devices paired with the second hardware fob.

2. The device of claim 1, wherein the mobile processor is further configured to:
receive a pairing request from a modular extension device via a wireless communications interface, the modular extension device being an input/output component that provides access to the functionality of the first fob device that would not otherwise be accessible; and
pair with the modular extension device.

3. The device of claim 1, wherein the mobile processor is further configured to:
  detect a broadcast from a previously paired modular extension device;
  pair with the previously paired modular extension device;
  convert a current interface state on a currently paired modular extension device to a new interface state based on a form factor of the previously paired modular extension device; and
  unpair from the currently paired modular extension device.

4. The device of claim 1, wherein the mobile processor is further configured to:
  detect a broadcast from a previously paired modular extension device;
  pair with the previously paired modular extension device; and
  extend a current interface state on a currently paired modular extension device to a new interface state based on the form factor of the previously paired modular extension device.

5. The device of claim 1, wherein the one or more paired modular extension devices is a heart rate monitor, the heart rate monitor providing an input indicating a heart rate to the first fob device.

6. The device of claim 1, wherein the one or more paired modular extension devices includes a haptic feedback device and a display, the haptic feedback device providing a haptic feedback output for the first fob device, and the display providing a display output for the first fob device.

7. The device of claim 1, wherein the one or more paired modular extension devices includes a smart thermostat, wherein the smart thermostat provides an input indicating temperature for the first fob device.

8. The device of claim 1, wherein the one or more paired modular extension devices includes an extended graphics accelerator, the extended graphics accelerator providing an input for the first fob device indicating a result of executed program instructions for image rendering.

9. The device of claim 1, wherein each of the one or more paired modular extension device stores a profile, and wherein the profile includes configuration information to instruct the first fob device on how to configure the respective paired modular extension device.

10. The device of claim 9, wherein the configuration information includes at least a standard set of parameters, the standard set of parameters available in stored profiles for all modular extension devices.

11. A computer-implemented method comprising:
  providing, by a first fob device, input and output interfaces to one or more paired modular extension devices that are customized for each of the one or more paired modular extension devices, the input and output interfaces customized to access an additional functionality provided by the one or more paired modular extension devices for the first fob device;
  detecting a pairing request from a second fob device;
  determining whether an identity information of the second fob device is authentic using public key cryptography;
  in response to determining that the identity information of the second fob device is authentic, prompting a user of the first fob device via the built-in output interface to determine whether the paring request should be granted;
  in response to receiving an input from the user via the built-in input interface that the pairing request should be granted, receiving input data from one or more modular extension devices paired with the second hardware fob via the second hardware fob, and transmitting output data to the second hardware fob for output to one or more modular extension devices paired with the second hardware fob; and
  wherein the first fob device is a hardware device that is contained within a portable housing, the portable housing below a threshold size, the threshold size being a size of the portable housing below which an input/output component cannot be integrated into the portable housing due to a size of the portable housing being smaller than a size of the input/output component, the input/output component extending a functionality for the first fob device to allow a user to execute a function of the first fob device that would not otherwise be available to the user due to the size of the portable housing.

12. The method of claim 11, further comprising:
  receiving a pairing request from a modular extension device via a wireless communications interface, the modular extension device being an input/output component that provides access to the functionality of the first fob device that would not otherwise be accessible; and
  pairing with the modular extension device.

13. The method of claim 11, further comprising:
  detecting a broadcast from a previously paired modular extension device;
  pairing with the previously paired modular extension device;
  converting a current interface state on a currently paired modular extension device to a new interface state based on a form factor of the previously paired modular extension device; and
  unpairing from the currently paired modular extension device.

14. The method of claim 11, further comprising:
  detecting a broadcast from a previously paired modular extension device;
  pairing with the previously paired modular extension device; and
  extending a current interface state on a currently paired modular extension device to a new interface state based on the form factor of the previously paired modular extension device.

15. The method of claim 11, wherein the one or more paired modular extension devices is a heart rate monitor, the heart rate monitor providing an input indicating a heart rate to the first fob device.

16. The method of claim 11, wherein the one or more paired modular extension devices includes a haptic feedback device and a display, the haptic feedback device providing a haptic feedback output for the first fob device, and the display providing a display output for the first fob device.

17. The method of claim 11, wherein the one or more paired modular extension devices includes a smart thermostat, wherein the smart thermostat provides an input indicating temperature for the first fob device.

18. The method of claim 11, wherein the one or more paired modular extension devices includes an extended graphics accelerator, the extended graphics accelerator providing an input for the first fob device indicating a result of executed program instructions for image rendering.

19. The method of claim 11, wherein each of the one or more paired modular extension device stores a profile, and wherein the profile includes configuration information to instruct the first fob device on how to configure the respective paired modular extension device.

20. The method of claim 19, wherein the configuration information includes at least a standard set of parameters, the standard set of parameters available in stored profiles for all modular extension devices.

21. The device of claim 1, wherein the threshold size is 70 mm in width, 40 mm in height, and 20 mm in depth.

\* \* \* \* \*